Dec. 15, 1959 J. W. BEGLEY 2,917,465
POLYMERIZATION CATALYST FEED CONTROL
Filed April 27, 1956 4 Sheets-Sheet 1

INVENTOR.
J. W. BEGLEY
BY *Hudson & Young*
ATTORNEYS

INVENTOR.
J. W. BEGLEY

INVENTOR.
J. W. BEGLEY

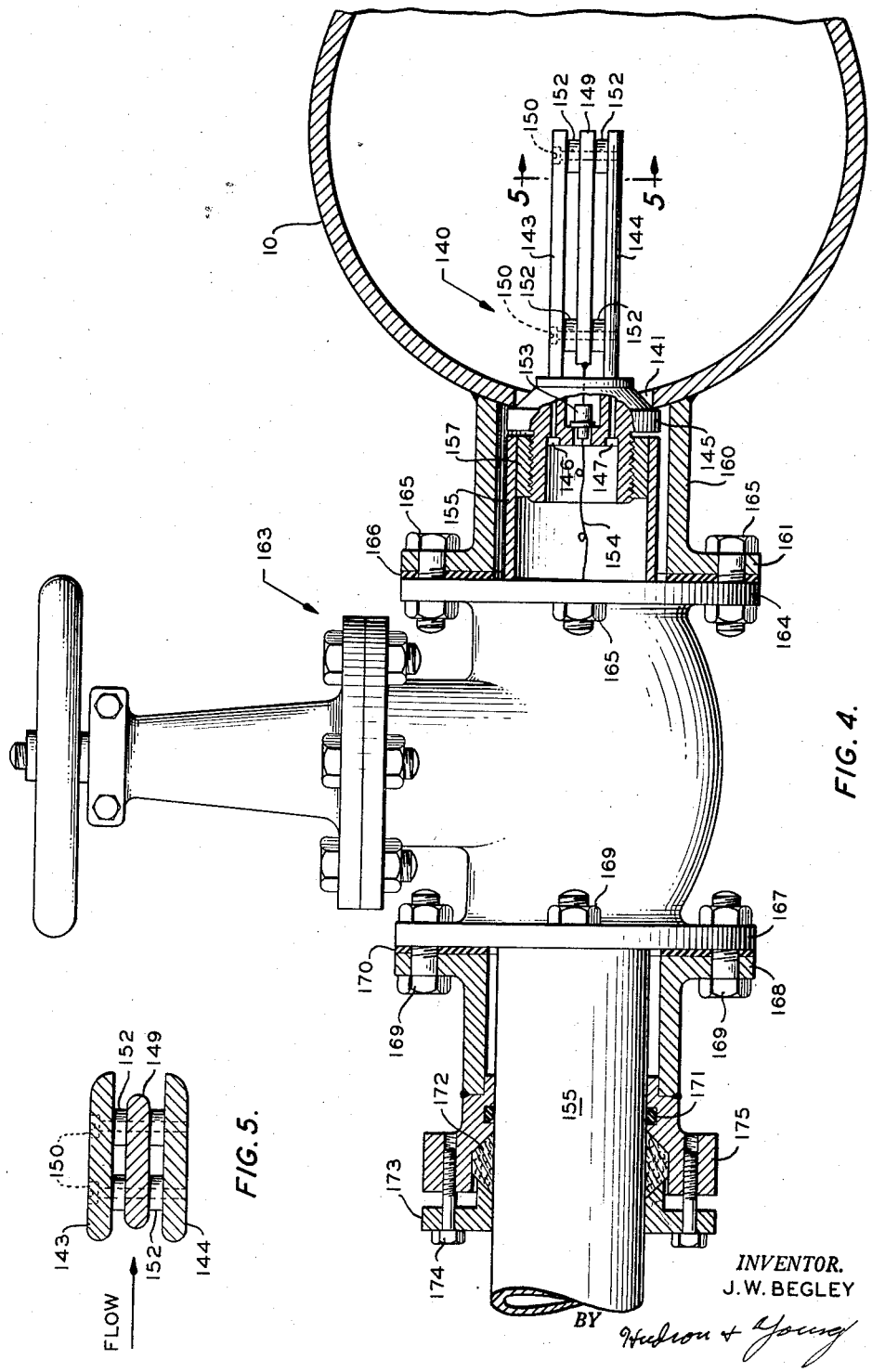

United States Patent Office 2,917,465
Patented Dec. 15, 1959

2,917,465

POLYMERIZATION CATALYST FEED CONTROL

John W. Begley, Ann Arbor, Mich., assignor to Phillips Petroleum Company, a corporation of Delaware Application April 27, 1956, Serial No. 581,149

6 Claims. (Cl. 252—430)

This invention relates to catalyst preparation. In one of its aspects, this invention relates to control of catalyst concentration by control of a catalyst slurry capacitance. In another aspect, this invention relates to an apparatus for controlling a slurry concentration.

It has been recently discovered that 1-olefins having a maximum monomer chain length of 8 carbon atoms and no branching nearer the double bond than the 4 position can be polymerized to solid and semi-solid polymers at low temperatures and pressures as compared with conventional processes for polymerizing these olefins. Such polymerization is generally carried out by first admixing and at least partially dissolving the olefin in a non-polymerizable solvent and carrying out the polymerization in the presence of a catalyst.

In the copending application of Hogan et al. filed December 20, 1954, now abandoned, and having Serial No. 476,306, a process is disclosed for producing novel polymers of 1-olefins by carrying out the polymerization at a temperature in the range of 150 to 450° F., in the presence of 0.1 to 10 or more weight percent of chromium oxide, including a substantial proportion of hexavalent chromium associated with at least one porous oxide selected from the group consisting of silica, alumina, zirconia, and thoria. A preferred catalyst is one comprising 0.1 to 10 weight percent chromium oxide on a silica-alumina support such as 90 percent silica-10 percent alumina. This catalyst is a highly oxidized catalyst which has been activated by high-temperature treatment with an oxidizing gas. Olefins other than the 1-olefins as described are polymerized by the action of this catalyst but such polymers are preponderantly normally liquid. The polymerization is preferably carried out in the liquid phase such as in solution in a hydrocarbon solvent, especially a paraffin or naphthene which is liquid under the polymerization conditions; however, vapor phase operation or mixed phase operation can be effected. Also, diolefins can be polymerized by the chromium oxide catalyst to produce solid polymers.

In one commercial method for the preparation of polymers using the above-identified catalyst, the catalyst is prepared for use by adding the desired pounds of catalyst to a catalyst slurry vessel, solvent added and a slurry of desired concentration made. This slurry is then fed to a conduit carrying the desired solvent and the solvent-slurry mixture continuously passed to the reactor. At the same time, monomers are continuously added to the reactor and an effluent stream containing polymer is continuously removed. For continuous operation, it is necessary that at least two catalyst slurry vessels be used so that one is on stream while the other is being prepared. In such an operation, the catalyst concentration will vary from batch to batch. However, for best performance of the reactor, the amount of catalyst fed must be controlled to within narrow limits. It has, therefore, been necessary to analyze each batch of catalyst slurry when prepared and to calculate a feed rate to give the desired catalyst addition rate. By the use of this invention, the feed rate is automatically compensated for variations in the concentration of the catalyst-slurry batch.

It is, therefore, an object of this invention to provide an improved catalyst feed system.

It is another object of this invention to provide a method of feeding catalyst to a polymerization zone.

It is still another object of this invention to provide an apparatus for controlling the rate of catalyst addition to a reactor.

Still other objects and advantages of this invention will be obvious to those skilled in the art having been given this disclosure.

I have found that the capacitance of a slurry of finely divided catalyst in a hydrocarbon liquid is dependent upon the concentration of catalyst in the slurry.

According to this invention, catalyst is slurried with a non-polymerizable hydrocarbon monomer solvent and the resulting slurry admixed with additional solvent at a rate responsive to the capacitance of the resulting admixture.

The diluents or monomer solvents especially useful in polymerization of the 1-olefins are hydrocarbons and preferably paraffins including cycloparaffins. These diluents include paraffins having 3 to 12 carbon atoms per molecule. Any of the paraffins which is a solvent for the heavy polymer at a temperature in the operating range is suitable. Any hydrocarbon diluent which is relatively inert, non-deleterious, and liquid under the reaction conditions of the process can be utilized. Diluents that have been used successfully include propane, isobutane, normal pentane, isopentane, isooctane (2,2,4-trimethylpentane), cyclohexane and methylcyclohexane. Aromatic diluents are, in general, not used since they appear to decrease the activity of the catalyst. They are, however, operative where short catalyst life can be tolerated.

While this invention is particularly useful in the preparation of 1-olefin polymers as claimed by Hogan et al., this invention can also be used for preparing slurries of constant concentration of the finely divided metallic catalyst in organic solvents. For example, hydrogenation catalyst in the oil to be hydrogenated, e.g., nickel in vegetable oils and metallic catalyst in polyethylene; other polymerization catalyst; e.g., phosphoric acid in toluene or sodium in hydrocarbons, etc.

This invention is particularly useful in the preparation of catalyst in solvent for the polymerization of 1-olefins in the presence of chromium-oxide catalyst such as in the preparation of high softening point polyethylene and this invention will be described in conjunction with such process.

The invention is best described in conjunction with the drawings of which:

Figure 4 is a side view, partially in section, of a suitable probe for the capacitance element; and, Figure 5 is a sectional diagram of the element.

Figure 1:
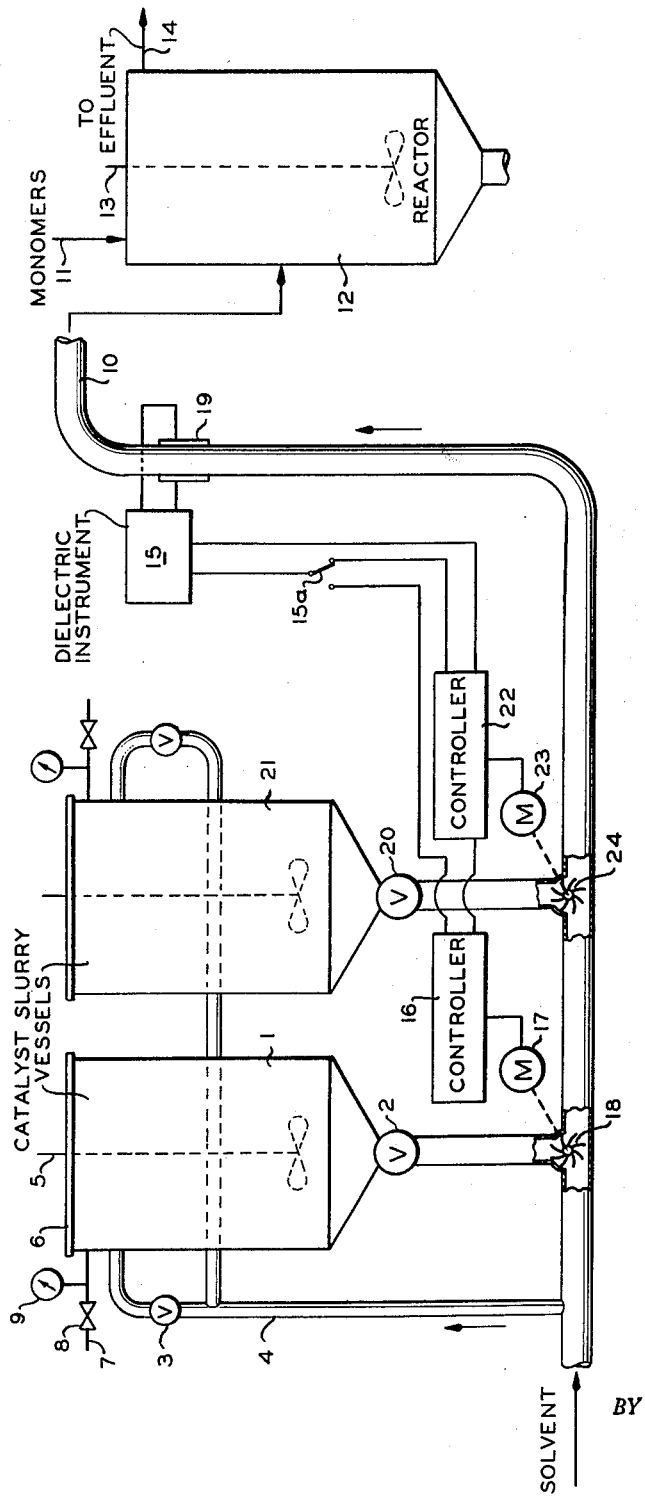
Figure 1 is a flow diagram illustrating a preferred embodiment of the control according to this invention.

Valves, pumps, etc. have been omitted from the drawing for clarity; it being within the skill of the art to supply these.

Referring now to the figures, valve 2 of vessel 1 is closed and solvent is admitted to the vessel via valve 3 and conduit 4 to a predetermined level. Stirrer 5 is started and the desired number of pounds of catalyst added. Top 6 is sealed in place and pressure is applied to the vessel by means of an inert gas such as nitrogen from conduit 7 via valve 8 until a predetermined pressure as registered on gauge 9 is obtained. Solvent containing suspended catalyst from conduit 10 and monomers from conduit 11 are continuously added to reactor 12 where stirrer 13 keeps the materials admixed. An effluent stream containing polymers is continuously removed from reactor 12 via conduit 14. When it is desired to put vessel 1 into service, valve 2 is opened and the capacitance control instrument 15 is switched via means of double throw switch 15a over to motor control 16 which in turn controls the speed of motor 17. This motor is connected to star valve 18 which is designed to feed a constant amount of slurry per revolution. The slurry from vessel 1, as it enters the solvent in conduit 10, is thoroughly admixed by turbulence and passes probe element 19 which is affected by the capacitance of the slurry and is detected by the instrument 15. The output from this instrument is picked up by controller 16 which in turn controls the speed of motor 17 responsive to changes in capacitance of the solvent-catalyst admixture. When the level of vessel 1 reaches a low point, valve 20 is opened, the dielectric element switched to controller 22 by means of switch 15a which operates to control the speed of motor 23 which in turn operates star valve 24 and slurry is removed from vessel 21 which had been previously prepared. Valve 2 is closed and vessel 1 is again made ready.

The above system can be made continuous by using only one atmospheric pressure vessel provided with a screw conveyor, vibrator, or other type dry feeder to add a continuous supply of catalyst and in which case valve 3 is replaced by a flow control device. Since the solvent is supplied under pressure, star valve 18 is then replaced with a slurry pump capable of supplying the slurry to the system. Still another alternative is to provide a liquid level device in each vessel which is operatively connected to valves 2 and 20 and switch 15a so as to switch tanks when the level reaches a predeterined minimum.

Figure 2:
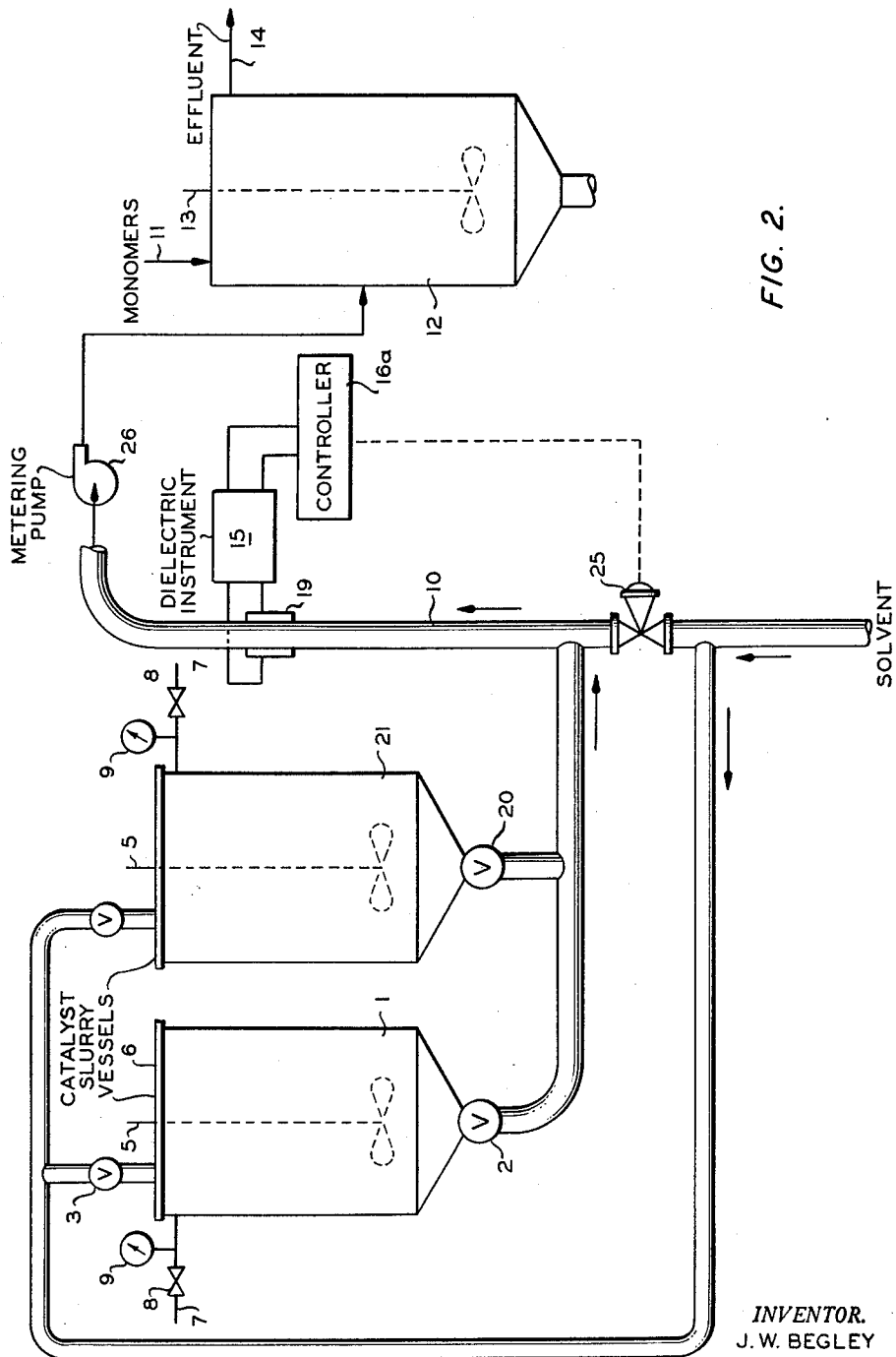
Figure 2 is a flow diagram of an alternate method of control according to this invention.

Figure 2 shows a second embodiment of this invention wherein two batch slurry vessels are employed. These vessels 1 and 21 are the same as of Figure 1, and the same reference numerals are employed on similar features. In this embodiment, the vessels open directly to solvent conduit 10 via valves 2 and 20. However, in this embodiment, a constant supply of catalyst in solvent is supplied by means of metering pump 26. The dielectric instrument is operably connected to controller 16a which in turn operates valve 25 to open and close same in response to changes in capacitance as detected by element 19. It is obvious that as valve 25 closes, a larger amount of material must be drawn from the slurry tanks to meet the demand of pump 26, and as valve 25 opens, a smaller amount of material will be drawn from the concentrate slurry tank.

This embodiment, like the embodiment of Figure 1, can be modified to provide a continuous system. This invention has been described in embodiments wherein the catalyst slurry is prepared batchwise and has been especially designed to modify the conventional commercial system to which it has particular application and advantages. However, in a continuous system, the conventional dry feeders are not extremely accurate and this invention can be used to good advantage in a continuous design as indicated.

Figure 3:
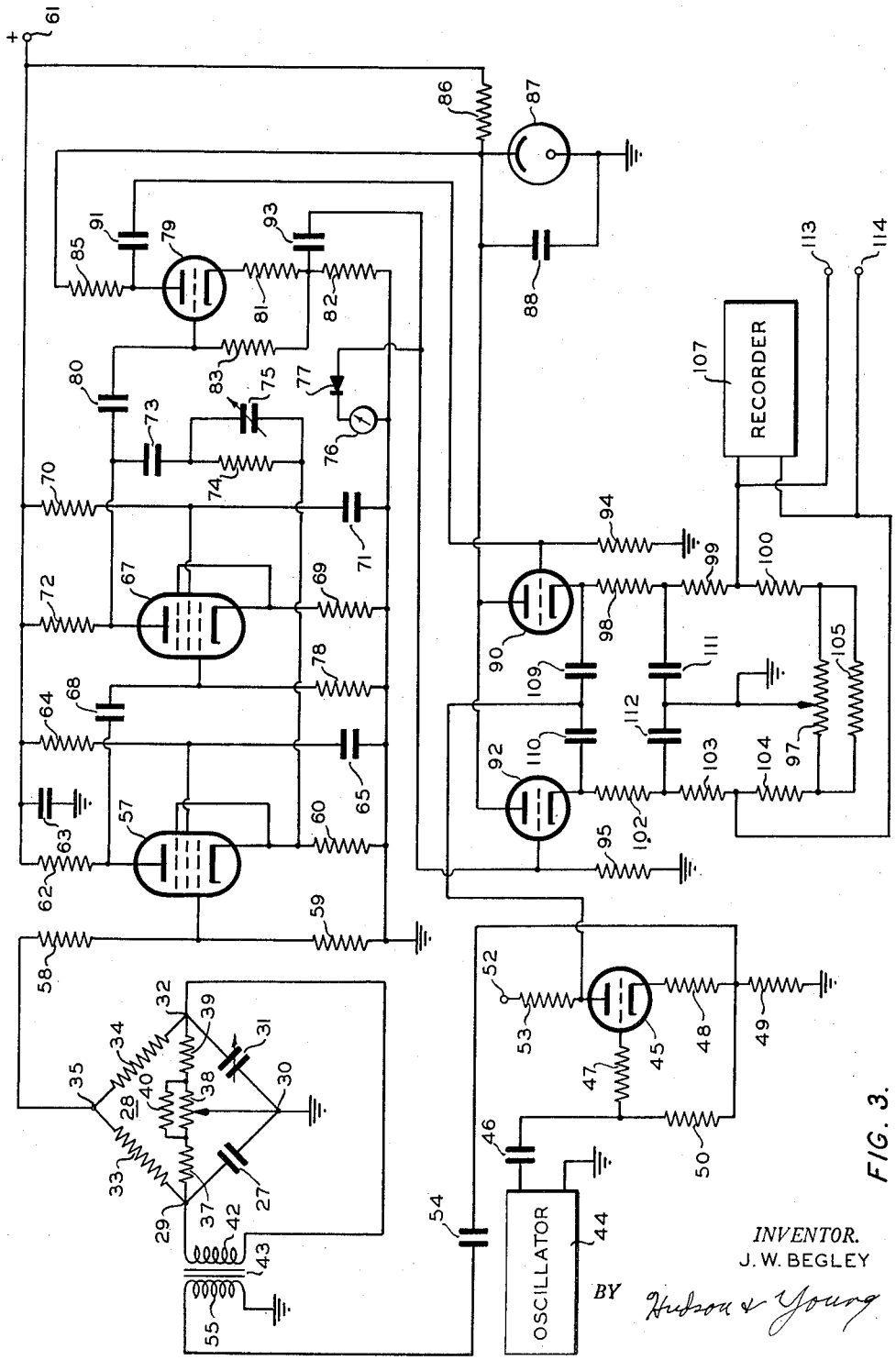
Figure 3 is a wiring diagram of a capacitance circuit suitable for use in this invention.

Figure 3 shows a dielectric circuit which can be used to good advantage in this invention; however, other circuits can also be employed, my invention being directed to the method of control and not to the circuit. This circuit is fully described and claimed in the copending application of D. A. Fluegel and E. D. Tolin having Serial No. 561,394, filed January 26, 1956. Referring now to Figure 3, there is shown a capacitor 27 which comprises the detecting element 19 employed to measure the dielectric properties of the catalyst-solvent mixture. Detecting element 19 obviously can be in the form of two or more spaced electrodes, one form will be described in conjunction with Figures 4 and 5.

Capacitor 27 is connected in bridge network 28. The two terminals of capacitor 27 are connected to respective terminals 29 and 30 of the bridge. An adjustable reference capacitor 31 is connected between terminal 30 and a third terminal 32. Resistors 33 and 34 are connected in series relationship between terminals 29 and 32. The junction between the resistors is designated as terminal 35. A resistor 37, a potentiometer 38, and a resistor 39 are connected in series relationship between terminals 29 and 32. A resistor 40 is connected in parallel with potentiometer 38. The contactor of potentiometer 38 is connected to terminal 30, which is in turn connected to ground. Bridge terminals 29 and 32 are connected to the respective end terminals of the secondary winding 42 of a transformer 43.

Transformer 43 is energized from the output of an oscillator 44. The first output terminal of oscillator 44 is connected to the control grid of a triode 45 through a capacitor 46 and resistor 47 which are connected in series relationship. The cathode of triode 45 is connected to ground through series connected resistors 48 and 49. The junction between resistor 47 and capacitor 46 is connected to the junction between resistors 48 and 49 by a resistor 50. The anode of triode 45 is connected to a positive potential terminal 52 through a resistor 53. The junction between resistors 48 and 49 is connected through a capacitor 54 to one terminal of the primary winding 55 of transformer 43. The second terminal of transformer 55 is connected to ground.

Output terminal 35 of bridge network 28 is connected to the control grid of pentode 57 through a resistor 58. The control grid of pentode 57 is connected to ground through a resistor 59. The cathode and suppressor grid of pentode 57 are connected to ground through a resistor 60. The anode of pentode 57 is connected to a positive potential terminal 61 through a resistor 62. A capacitor 63 is connected between terminal 61 and ground. The screen grid of pentode 57 is connected to terminal 61 through a resistor 64 and to ground through a capacitor 65. The anode of pentode 57 is also connected to the control grid of a pentode 67 through a capacitor 68. A resistor 78 is connected between the control grid of pentode 67 and ground. The cathode and suppressor grid of pentode 67 are connected to ground through a resistor 69. The screen grid of pentode 67 is connected to a terminal 61 through a resistor 70 and to ground through a capacitor 71. The anode of pentode 67 is connected to terminal 61 through a resistor 72.

The anode of pentode 67 is also connected to the cathode of pentode 57 through a feedback network which comprises a capacitor 73 and a resistor 74 which are connected in series relationship. A variable capacitor 75 is connected in parallel with resistor 74 to change the phase of the feedback signal.

The anode of pentode 67 is connected to the control grid of a triode 79 through a capacitor 80. The cathode of triode 79 is connected to ground through series connected resistors 81 and 82. The control grid of triode 79 is connected to ground through series connected resistors 83 and 82. The anode of triode 79 is connected to terminal 61 through series connected resistors 85 and 86. A voltage regulating tube 87 is connected between ground and the junction between resistors 85 and 86, and a capacitor 88 is connected in parallel with this tube.

The anode of triode 79 is also connected to the control grid of a triode 90 through a capacitor 91. The junction between resistors 81 and 82 is connected to the control grid of a triode 92 through a capacitor 93. The control grids of triodes 90 and 92 are connected to ground through respective resistors 94 and 95. A null detecting meter 76 is connected between ground and the grid of triode 92 through rectifier 77. The anodes of triodes 90 and 92 are connected to one another and to terminal 61 through resistor 86. The cathode of triode 90 is connected to the first end terminal of a potentiometer 97 through series connected resistors 98, 99, and 100. The cathode of triode 92 is connected to the second end terminal of potentiometer 97 through series connected resistors 102, 103, and 104. The contactor of potentiometer 97 is connected to ground. A resistor 105 is connected in parallel with potentiometer 97. The junction between resistors 99 and 100 is connected to the first input terminal of a recorder 107, and the junction between resistors 103 and 104 is connected to the second input terminal of recorder 107. The anode of triode 45 is connected to the cathode of triodes 90 and 92 through respective capacitors 109 and 110. A capacitor 111 is connected between ground and the junction between resistors 98 and 99, and a capacitor 112 is connected between ground and the junction between resistors 102 and 103. Terminals 113 and 114 are provided for connecting a controller such as 16, 16a, or 22.

The operation of this circuit will now be described. The output of oscillator 44 is applied through cathode follower 45 and transformer 43 across terminals 29 and 32 of bridge network 28. It should be evident that this network forms a capacity bridge. If the bridge is balanced there is a zero potential difference between terminals 30 and 35. However, any unbalance of the bridge due to a change in capacitance of element 27 results in a potential at terminal 35 changing from ground potential. Also, any unbalance in the resistance arm including resistors 37, 38, 39, and 40, or any change in the loss factor of the material in condenser 27, results in the potential at terminal 35 changing from ground potential. This latter potential is 90° out of phase with the potential due to a change in capacity of condenser 27. This potential is applied to the grid of pentode 57. Any unbalance signal is amplified by pentodes 57 and 67, and applied to the control grid of triode 79. Triode 79 provides two output signals which are 180° out of phase with one another. These two signals are applied to the control grids of triodes 90 and 92, respectively. Triodes 90 and 92 and the associated circuit form a phase sensitive detector. A reference signal is applied to the cathodes of these tubes from the output of triode 45. The two signals applied to the phase detector network are thus of the same frequency because they are both obtained from oscillator 44. The currents through the two triodes are functions of the amplitudes of the signals applied to the control grids and the phases of these signals with respect to the reference signal applied to the cathodes. The resistors and capacitors in the cathode circuits of the two triodes filter the currents through the triodes. If the capacitance of capacitor 27 becomes greater than that of capacitor 31, bridge network 28 is unbalanced in a first direction. If the capacitance of capacitor 27 becomes less than that of capacitor 31, the bridge is unbalanced in the opposite direction. The phase of the output signal from the bridge thus changes by 180° when the direction of the unbalance changes.

Bridge network 28 is balanced initially by varying capacitor 31 and potentiometer 38 until the recorder 107 reads zero, or a predetermined value as determined by the setting of the contactor of potentiometer 97, when a reference material is disposed between the plates of capacitor 27. The contactor of potentiometer 38 alone is then moved to determine if the signal applied to the recorder 107 changes. If a change is observed, capacitor 75 is varied to change the phase of the signal applied to the control grid of triode 79. Adjustment of capacitor 75 is continued to restore the recorder to the initial value. The contactor of potentiometer 38 is then adjusted until the reading of meter 76 is zero, which indicates that there is a zero potential difference between bridge terminal 30 and 35. At this final point, any further change of the position of the contactor of potentiometer 38 does not change the recorder reading. The bridge circuit is then balanced and the apparatus is ready for use. Any change in capacitance of capacitor 27 results in a change in the signal as applied to control instruments 16, 16a, and 22 by connecting same to terminals 113 and 114.

In Figures 4 and 5, there is illustrated a configuration of a capacitance probe element that is particularly adapted for use in a conduit such as 10. This probe 140 is to be used as the capacitor 27 of the circuit of Figure 3. This probe 140 is shown inserted through an opening 141 in a conduit 10. Probe 140 comprises a pair of spaced metallic plates 143 and 144 which are attached to a housing plug 145 by respective screws 146 and 147. A third metallic plate 149 is interposed between plates 143 and 144, and screws 150 serve to hold the three plates in spaced relation with one another. These screws pass through insulating plugs 152 which retain plate 149 electrically insulated from plates 143 and 144. An insulator 153 is mounted in plug 145 and an electrical lead 154 passes through insulator 153 to engage plate 149. An elongated cylindrical housing member 155 is attached at one end to plug 145 and bushing 157 is interposed therebetween.

This capacitance probe unit conveniently is inserted in conduit 10 through a suitable valve assembly. A nipple 160 is welded to conduit 10 so as to enclose opening 141. Nipple 160 is formed with a flanged end 161 to which a gate valve 163 having a first annular plate 164 attached thereto is secured by bolts 165. A gasket 166 is interposed between nipple 160 and valve 163. A second annular plate 167 is attached to the second opening of valve 163 and this second plate 167 is in turn secured to a flanged nipple 168 by a plurality of bolts 169. A gasket 170 is interposed between nipple 168 and plate 167. An annular packing gland assembly 175 is welded to the second end of nipple 168. This packing gland houses an O-ring 171 which engages housing 155. A quantity of packing material 172 is also contained in assembly 175. A packing retaining plate 173 is attached to the end of packing gland 175 by a plurality of screws 174. By this arrangement, the probe element can readily be inserted in conduit 10 by opening gate valve 163. When so positioned, assembly 175 prevents leakage.

Capacitor plates 143, 144, and 149 are streamlined in the manner illustrated in Figure 5. The leading edges of plates 143 and 144 are completely rounded and the trailing edges of these two plates are half rounded. Both the leading and trailing edges of plate 149 are completely rounded. This particular configuration reduces turbulence in the flowing fluid and enables a more accurate reading of the dielectric properties of the fluid to be obtained. Plates 143 and 144 are electrically connected to one another through plug 145 which is maintained at ground potential. In this manner, the outer plates form one capacitor element with respect to the inner plate and shield the inner plate from the effect of metallic conduit 10. This latter feature also enables a more accurate measurement of the dielectric properties of the fluid to be made.

This invention has been described with reference to two preferred embodiments. A suitable circuit has been described and a suitable probe element has been described. It will be understood by those skilled in the art, that other circuits and other probe elements can be used in this invention. Those skilled in the art will see many modifications which can be made and still obtain the advantages of this invention.

I claim:

1. In a process wherein a slurry of a solid catalyst comprising chromium oxide, at least a portion of which comprises hexavalent chromium, in association with at least one oxide selected from the group consisting of silica, alumina, zirconia, and thoria is prepared in a liquid hydrocarbon selected from the group consisting of paraffins and cycloparaffins and supplied to a reaction zone, the improvement comprising measuring the electrical capacitance of said slurry, controlling the concentration of said catalyst in said slurry to correspond to a predetermined electrical capacitance and supplying said slurry having a controlled concentration to a reaction zone.

2. The process according to claim 1 wherein said hydrocarbon is cyclohexane and said chromium oxide is supported on a silica-alumina composite.

3. In a process wherein a catalyst selected from the group consisting of inorganic oxides and metals is prepared and utilized in the form of a slurry thereof in a saturated hydrocarbon diluent, the improvement which comprises preparing a concentrated suspension of said catalyst in said diluent, feeding said suspension into a separate stream of said diluent, measuring the electrical capacitance of the resulting diluted slurry, and controlling the rate of feed of said suspension into said stream of said diluent in response to the electrical capacitance of said diluted slurry and thereby controlling the concentration of said slurry to obtain a predetermined electrical capacitance thereof and consequently a predetermined desired concentration of catalyst therein.

4. In a process wherein a slurry of a catalyst comprising chromium oxide supported on at least one carrier component selected from the group consisting of silica, alumina, zirconia, and thoria in an inert organic diluent is prepared, the improvement which comprises preparing a concentrated suspension of said catalyst in said diluent, feeding said suspension into a separate stream of said diluent, measuring the electrical capacitance of the resulting diluted slurry, and controlling the rate of feed of said suspension into said stream of said diluent in response to the electrical capacitance of said diluted slurry and thereby controlling the concentration of said slurry to obtain a predetermined electrical capacitance thereof and consequently a predetermined desired concentration of catalyst therein.

5. In a process wherein a slurry of a catalyst comprising chromium oxide supported on silica-alumina, at least part of the chromium being hexavalent, in a saturated hydrocarbon having from 3 to 12 carbon atoms per molecule is prepared, the improvement which comprises preparing a concentrated suspension of said catalyst in said hydrocarbon, feeding said suspension into a separate stream of said hydrocarbon, measuring the electrical capacitance of the resulting diluted slurry, and controlling the rate of feed of said suspension into said stream of said hydrocarbon in response to the electrical capacitance of said diluted slurry and thereby controlling the concentration of said slurry to obtain a predetermined substantially constant electrical capacitance thereof and consequently a predetermined desired concentration of catalyst therein.

6. In a process wherein a slurry of a catalyst comprising chromium oxide supported on silica-alumina, at least part of the chromium being hexavalent, in cyclohexane is prepared, the improvement which comprises preparing a concentrated suspension of said catalyst in cyclohexane, feeding said suspension into a separate stream of cyclohexane, measuring the electrical capacitance of the resulting diluted slurry, and controlling the rate of feed of said suspension into said stream of cyclohexane in response to the electrical capacitance of said diluted slurry and thereby controlling the concentration of said slurry to obtain a predetermined substantially constant electrical capacitance thereof and consequently a predetermined desired concentration of catalyst therein.

References Cited in the file of this patent

UNITED STATES PATENTS

| | | |
|---|---|---|
| 2,242,488 | Thacker | May 20, 1941 |
| 2,285,765 | Carswell | June 9, 1942 |
| 2,339,349 | Morey | Jan. 18, 1944 |
| 2,377,363 | Noble et al. | June 6, 1945 |
| 2,529,310 | Richardson et al. | Nov. 7, 1950 |
| 2,587,531 | Saxe | Feb. 26, 1952 |